United States Patent [19]

Van Der Piepen et al.

[11] Patent Number: 5,419,810
[45] Date of Patent: May 30, 1995

[54] THIN-FILM EVAPORATOR MADE OF A CORROSION RESISTANT MATERIAL

[75] Inventors: Rolf Van Der Piepen, Butzbach; Lothar Weimann, Obermörlen, both of Germany

[73] Assignee: Buss AG, Basel, Switzerland

[21] Appl. No.: 961,921

[22] PCT Filed: Apr. 16, 1992

[86] PCT No.: PCT/EP92/00856
§ 371 Date: Jan. 4, 1993
§ 102(e) Date: Jan. 4, 1993

[87] PCT Pub. No.: WO92/19370
PCT Pub. Date: Nov. 12, 1992

[30] Foreign Application Priority Data
May 2, 1991 [DE] Germany .................. 41 14 334.5

[51] Int. Cl.$^6$ .............................................. B01D 1/22
[52] U.S. Cl. ............................ 159/6.2; 159/13.2; 159/49; 159/DIG. 15; 165/905; 202/236; 202/267.1; 203/86
[58] Field of Search .......... 159/6.2, DIG. 15, 49, 159/13.2; 202/236, 267.1; 203/86; 165/905

[56] References Cited

U.S. PATENT DOCUMENTS

| | | | |
|---|---|---|---|
| 2,721,730 | 10/1955 | Clause et al. | 165/89 |
| 2,751,339 | 6/1956 | Inman | 159/6.2 |
| 2,890,155 | 6/1959 | Bueche | 159/13.2 |
| 2,993,842 | 7/1961 | Smith | 159/6.2 |
| 3,054,444 | 9/1962 | Robbins . | |
| 3,054,729 | 9/1962 | Smith | 159/6.2 |
| 4,208,243 | 6/1980 | Knotik et al. . | |
| 4,474,233 | 10/1984 | Swozil . | |

FOREIGN PATENT DOCUMENTS

| | | |
|---|---|---|
| 0262510 | 4/1988 | European Pat. Off. . |
| 1047807 | 12/1958 | Germany . |
| 2657076 | 12/1977 | Germany . |

*Primary Examiner*—Wilbur Bascomb, Jr.
*Attorney, Agent, or Firm*—Spencer, Frank & Schneider

[57] ABSTRACT

The invention relates to a thin-film evaporator equipped with a heatable tubular evaporator body in whose product charged interior a driven rotor is disposed which is equipped with essentially radially oriented vanes. The invention is formed from an evaporator body of at least one thick-wall graphite tube with a plurality of essentially axially extending bores disposed in the tube walls, each one of the bores open at the tube ends into an annular channel which is in communication with a connecting pipe stub for a heating medium.

Since the treatment of corrosive media, for example acids charged with solids, places high demands on corrosion resistance of the materials employed and additionally high demands for accuracy of the work, it is proposed to form the evaporator body (1) of at least one thick-wall graphite tube (2); to dispose a plurality of essentially axially extending bores (14) in the tube walls; and to have each one of the bores (14) open at the tube ends into an annular channel (15, 16) which is in communication with a connecting pipe stub (6, 9) for a heating medium.

13 Claims, 5 Drawing Sheets

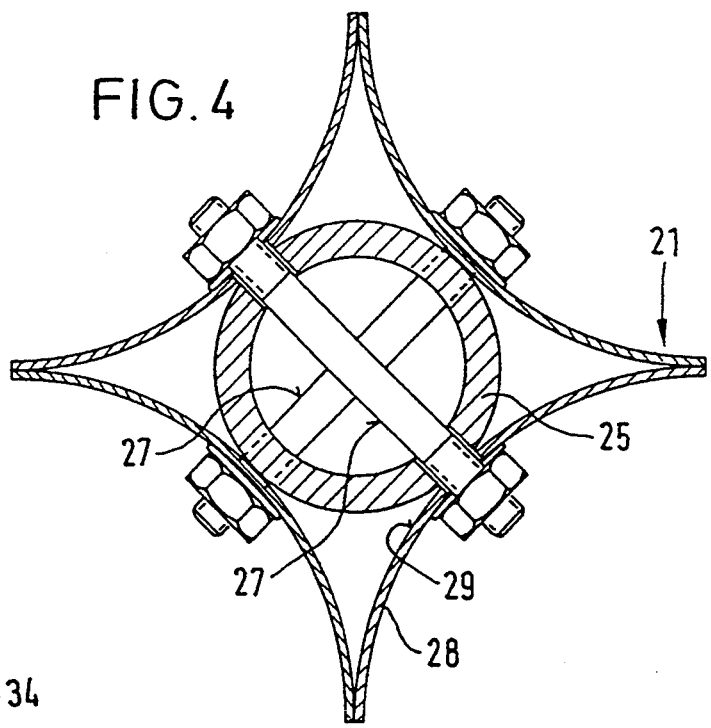
FIG. 4
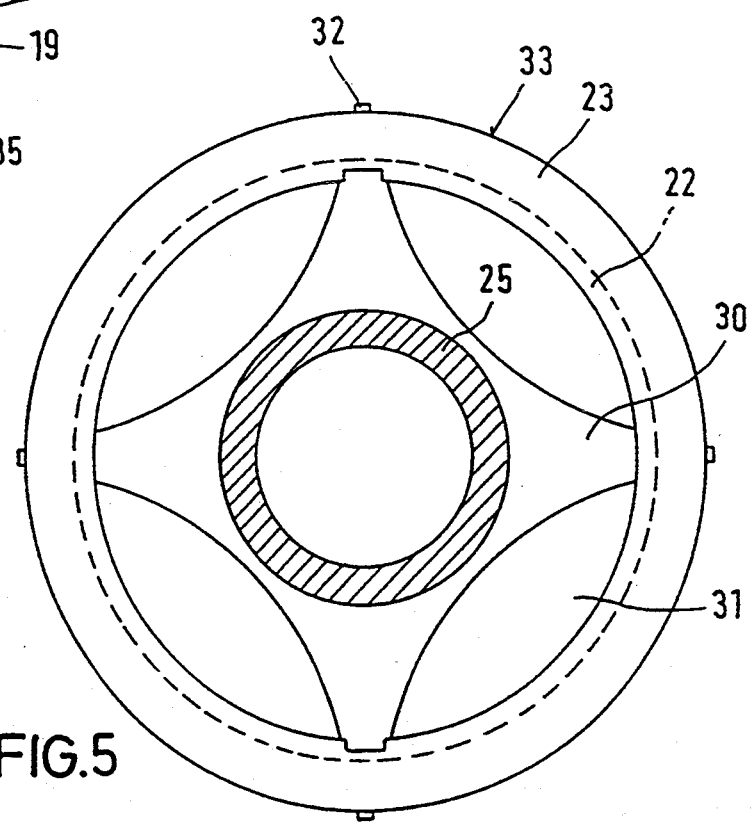
FIG. 6
FIG. 5

THIN-FILM EVAPORATOR MADE OF A CORROSION RESISTANT MATERIAL

BACKGROUND OF THE INVENTION

1. Field of the Invention

The invention relates to a thin-film evaporator including a heatable tubular evaporator body with an externally driven rotor equipped with essentially radially oriented vanes being disposed in the product charged interior of the evaporator body.

2. Description of the Related Art

Thin-film evaporator of the above-mentioned type are employed for the concentration of viscous, temperature sensitive and/or coating forming substances. They are all based on the principle of producing, with the aid of a rotating rotor, a thin layer of the product in the interior of a heated cylinder or cone so that the heat introduced through the cylinder wall leads to the evaporation of the liquid. The vapors need traverse only a short path through the product. Thus it is possible to concentrate solids containing liquids to high solids concentrations up to 80 weight % dry substance. The rotor is equipped with rigid vanes which are arranged with a narrow gap of a few millimeters from the heated wall or the rotor is equipped with movable wiper blades so that the product running over the heated walls of the evaporator body can be restricted to a thin film of product. When treating corrosive media, for example for the concentration of acids charged with solids, the corrosion problems cannot be solved with metal materials, particularly since the evaporator body must also be designed as a pressure vessel. Tests with enamel coatings are able to solve the corrosion problem only in special cases, particularly since it is practically impossible in larger units to perform the necessary mechanical work.

SUMMARY OF THE INVENTION

It is the object of the invention to configure a thin-film evaporator of the above-mentioned type so that the evaporator body has good corrosion resistance with good heat conductivity.

This is accomplished according to the invention in that the evaporator body is formed by at least one thick-walled tube of graphite; a plurality of essentially axially extending bores are disposed in the tube wall; and the bore openings at the tube ends each open into an annular channel which is in communication with a connecting pipe stub for a heating medium. Surprisingly, it has been found that such an evaporator body made of a thick-walled graphite tube not only has excellent heat conducting properties but also permits the heating medium to flow through it at high pressures. The interior of such a cylindrical or conical graphite tube can be worked properly and very precisely so that it is possible with the aid of the rotor to apply a uniformly thin product film onto the interior wall of the tube as it is required for high evaporator output.

As an advantageous feature of the invention it is provided that the annular channel is configured as an open groove in a clamping ring that can be placed against the end face of the tube; the tube is held in a sealed manner by way of spring-tensioned clamping anchors between two clamping rings at its ends and the clamping rings are each provided with a connecting pipe stub for the heating medium, with the pipe stub opening into the associated groove. The clamping rings are here made of metal, preferably steel, with their interior faces that come in contact with the product being coated or lined with corrosion resistant materials. Thus, corrosion resistance can also be realized in these regions and advantage is taken of the fact that requirements for precision are less in the regions of the clamping rings that lie outside of the operating range of the rotor vanes. Due to the use of the clamping anchors, the graphite evaporator body is able to retain its simple geometric shape, with the clamping anchors including the required clamping springs being configured in such a way that they are able to withstand the pressures exerted by the heating medium, that is, they keep the clamping rings in close contact with the end faces of the graphite tube.

As a further feature of the invention it is provided that the upper clamping ring, as the head ring, is equipped with an inlet pipe stub for the product to be treated and with a discharge pipe stub for the vapors. Thus this component including the pipe stubs can be produced as a closed component.

As another advantageous feature of the invention it is provided that the lower clamping ring, as the discharge ring, is equipped with an inwardly projecting circumferential conical collar.

Another, preferred feature of the invention provides that the rotor component disposed in the interior of the evaporator body is composed essentially of a graphite core tube to which are fastened the vanes that are produced of a graphite. Thus, it is ensured that the same process conditions are maintained for the evaporator region covered by the rotor vanes, on the one hand, and for the rotor itself. In this connection it is advisable, as a further feature, for the vanes to be formed by at least three thin plates that are curved in the manner of a bowl and whose longitudinal edges lie against one another and which are each fastened by means of clamping screws in the peak region of the core pipe. In this connection it is advisable for the core pipe to be made of graphite and the vanes of a carbon fiber reinforced material, for example, a carbon fiber reinforced plastic, so that the edges of the thin curved plates forming the vanes lie against one another under tension and reinforce one another.

As a further feature of the invention it is provided that the thick-walled tube forming the evaporator body and/or the core tube of the rotor and/or the rotor vanes are composed of a carbon fiber reinforced material. In this connection it is advisable to use combinations so that, for example, the tube of the evaporator body is made of graphite while the rotor is produced of a carbon fiber reinforced material, for example, a carbon fiber reinforced plastic. The advantage is that the rotor in particular with its components including the core pipe can be produced of thin-walled elements which are very strong. This is of interest particularly if instead of rigid vanes, the rotor is equipped with movable wiper blades. The term graphite in the sense of the present invention refers to fine-grained, porous electrographite bodies which are made corrosion, temperature and pressure resistant by impregnation with high molecular synthetic resins.

BRIEF DESCRIPTION OF THE DRAWINGS

The invention will now be described in greater detail with reference to schematic drawings, in which:

FIG. 4 is a sectional view of the rotor seen along line IV—IV of FIG. 3;

FIG. 5 is a sectional view of the rotor seen along line V—V of FIG. 3;

FIG. 6 depicts a rotor having a solid rotor body; and

DETAILED DESCRIPTION OF THE PREFERRED EMBODIMENT

Figure 1:
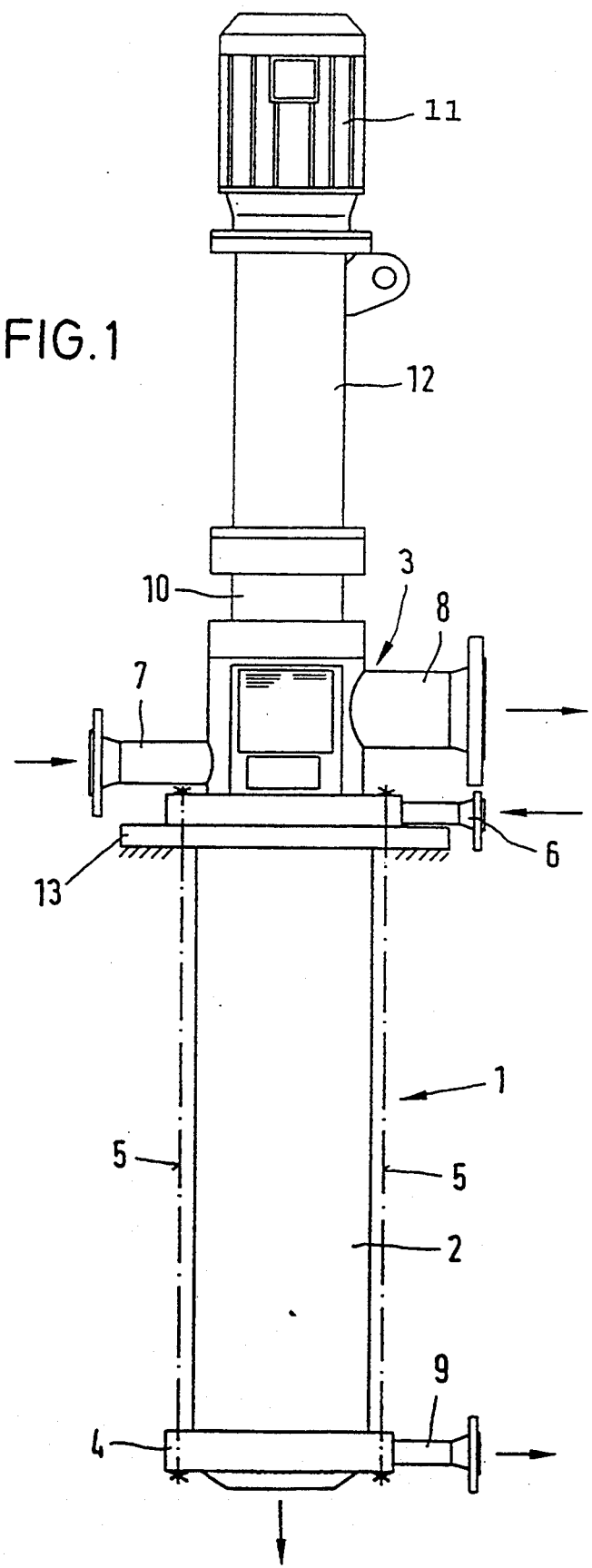
FIG. 1 is a side view of a thin-film evaporator.

The thin-film evaporator shown in FIG. 1 is essentially composed of an evaporator body 1 equipped with a thick-walled graphite tube whose configuration will be described in greater detail in connection with FIG. 2. By means of a lower clamping ring 4 and an upper clamping ring 3 and with the aid of a plurality of clamping rods 5 that are distributed uniformly around its circumference, the ends of thick-walled tube 2 are urged against the rings 3 and 4.

The upper clamping ring 3 is here configured as a head ring and its region lying directly against tube 2 is equipped with a connecting pipe stub 6 for the introduction of a heating medium. The head ring is further provided with an inlet pipe stub 7 for the product to be treated and with a discharge pipe stub 8 for the discharge of the vapors generated in the evaporation process. Clamping ring 4 in turn is provided with a connecting pipe stub 9 through which the heating medium is extracted. The configuration of head ring 3 and discharge ring 4 will be described in greater detail below with reference to the sectional view of FIG. 2.

Head ring 3 is followed at the top by a housing 10 through which pass the bearing and the seal for the shaft of the rotor disposed in the thin-film evaporator. A drive motor 11 is supported on housing 10 by way of a shaft protecting tube 12. The entire arrangement is supported by way of head ring 3 on a supporting flange 13 and is releasably connected with the latter. The concentrated product leaves through the discharge opening formed by discharge ring 4.

Figure 2:
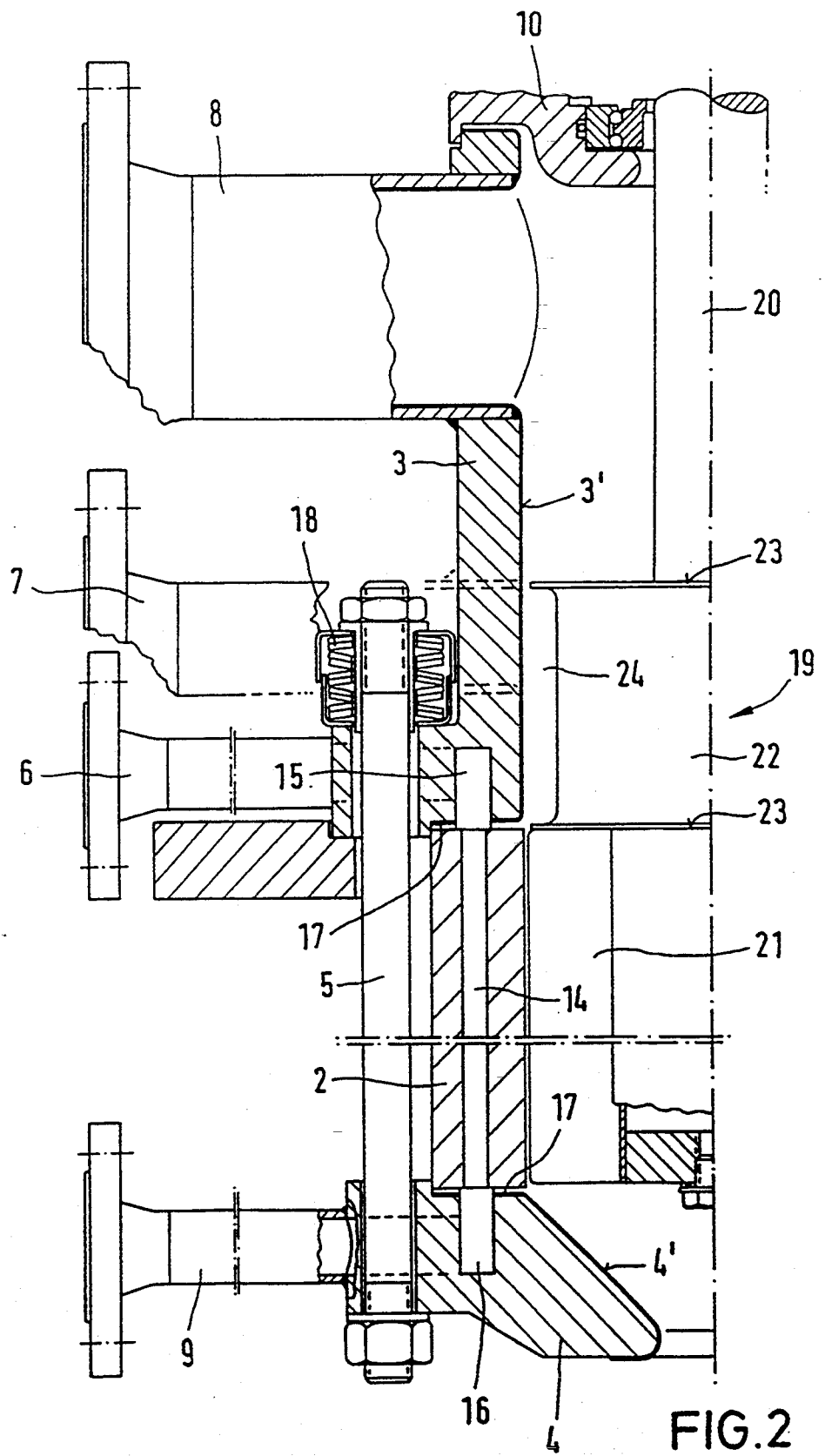
FIG. 2 is a partial longitudinal sectional view of the tubular evaporator body.
Figure 7:
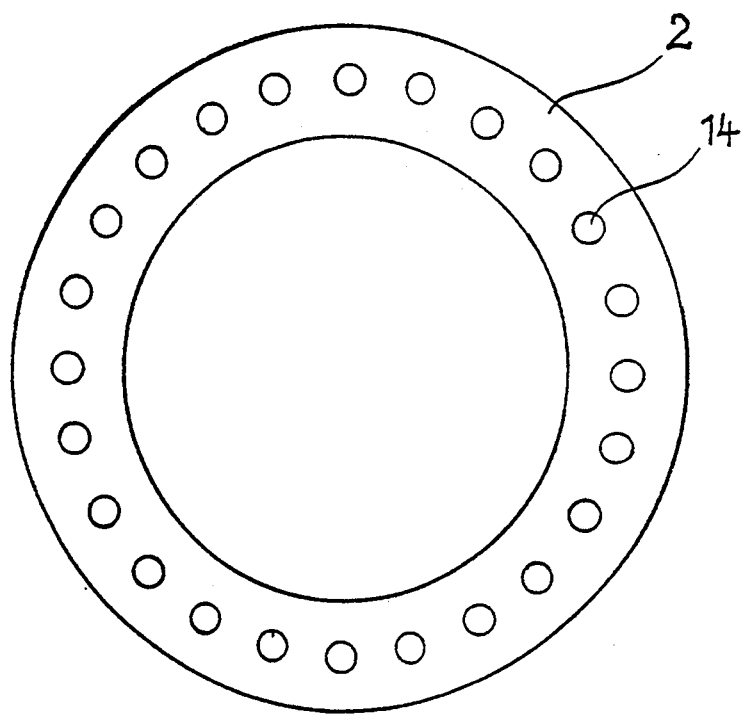
FIG. 7 depicts and end view of the tubular evaporator body with the clamping ring removed.

As can be seen in the partial vertical longitudinal sectional view of evaporator body 1 shown in FIG. 2, tube 2 is given relatively thick walls and these walls are provided with a plurality of axially parallel bores 14 (FIG. 7). Each one of bores 14 opens at its end face into a groove 15 in head ring 3 and into a groove 16 in discharge ring 4, with these grooves forming an annular channel into which open the connecting pipe stubs 6 and 9 for the heating medium. Head ring 3 and discharge ring 4 are tightly clamped to tube 2 by means of tension rods 5 and seals 17 placed therebetween, with the thermal expansion of tube 2 being absorbed by way of a pre-tensioned spring packet 18. On their faces coming in contact with the product, head ring 3 and discharge ring 4 are provided with a corrosion resistant coating 3' and 4'.

Figure 3:
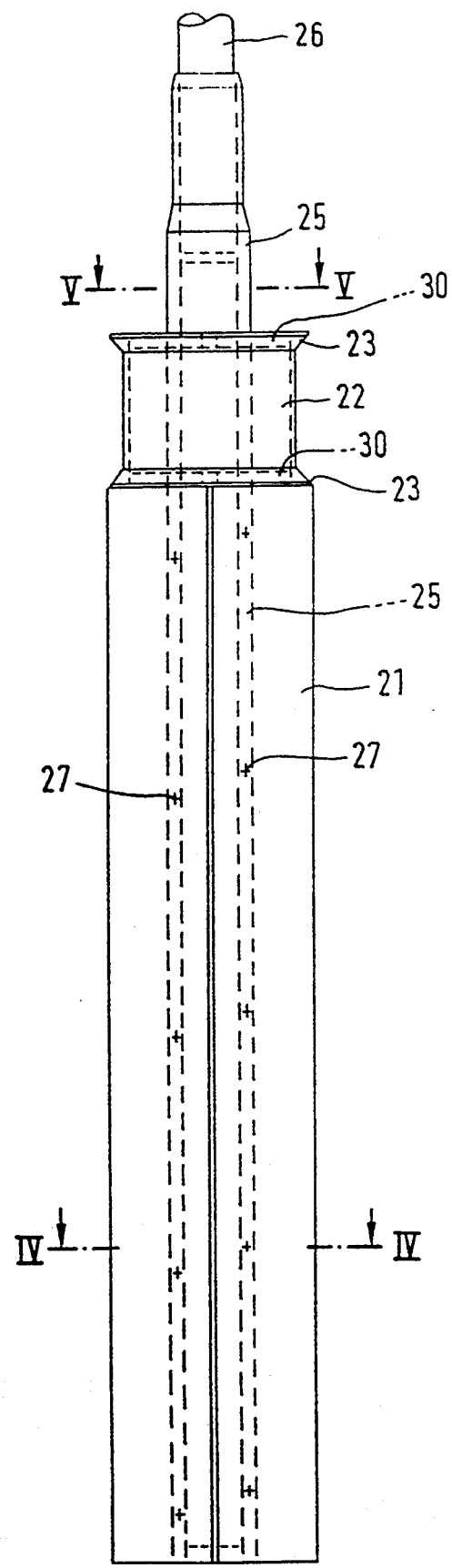
FIG. 3 depicts a rotor equipped with rigid vanes.

The rotor 19, which is shown only as a half-section, is disposed in the interior. At the upper end of the rotor, a connecting shaft 20 is in communication with drive motor 11. The essentially tubular rotor, whose configuration will be described in greater detail in connection with FIGS. 3, 4, and 5, is provided with vanes 21. As shown in FIG. 2, vanes 21 cover only the region of tube 2. In the region of head ring 3, rotor 19 is terminated at the top by a charging ring 22 which is delimited by an upper and lower edge web 23 so that an annular chamber 24 is formed there into which opens the inlet pipe stub 7 for the product to be treated so that the product is able to enter in the form of a thin film into tube 2 and thus into the effective range of rotor vanes 21. The resulting vapors are extracted through discharge pipe stub 8 which, depending on the process, also serves to produce a vacuum in the interior of the thin-film evaporator.

FIG. 3 is a side view showing the entire rotor. The rotor is essentially composed of a core tube 25 onto which vanes 21 are placed in a manner to be described in greater detail below. Charging ring 22 terminates the region occupied by vanes 21 at the top. Above charging ring 22, core tube 25 is connected to a drive shaft 26 that is connected with drive motor 11 and is made of steel in the conventional manner since this region of the rotor is disposed above the housing 10 provided with the seals. In contrast thereto, core tube 25 is made of graphite or a carbon fiber reinforced material.

The configuration is shown in FIG. 4 which is a sectional view to a larger scale seen along line IV—IV of FIG. 3. Core tube 25 is here provided with a plurality of bores over its length which intersect in a spaced arrangement and through which clamping screws 27 can then be placed. The outer ends of the clamping screws are shown schematically in FIG. 3.

In the illustrated embodiment, rotor vanes 21 are formed by four bowl-shaped curved thin plates 28 whose longitudinal edges lie against one another, with clamping screws 27 in peak region 29 pressing the plates against core tube 25. As indicated by the top view shown in FIG. 5 onto charging ring 22, approximately star-shaped plates 30 are provided at both ends, with the lower plate covering the space between core tube 25 and the interior of plate 28. The space 31 remaining in the interior between edge web 23 serves as a passage channel for the vapors to be extracted. The top view of FIG. 5 further shows that the outer edges 32 of vanes 21 project only slightly beyond the outer edge 33 of edge webs 23.

As indicated in the sectional view of FIG. 6, rotor 19 may also be provided with a solid, graphite rotor body 34 that has an approximately star-shaped cross section and whose end face edges 35 are provided with preferably exchangeable edge elements 36. These edge elements which extend over the length of rotor body 34 and are composed of one or a plurality of juxtaposed components are likewise made of a corrosion resistant material, for example a carbon fiber reinforced material. Edge elements 36 may here be rigid or may be connected with rotor body 34 in the form of movable wiper blades.

We claim:

1. A heatable thin-film evaporator, comprising:
   an externally driven rotor with essentially radially oriented vanes disposed in a tubular evaporator body;
   the evaporator body, including at least one thick-walled graphite tube having a first end face and a second end face, a plurality of bores extending essentially axially between the first and second end faces, a first clamping ring having a first edge and a second edge, the first edge including a first open groove annular channel, the first end face of the evaporator body being coupled to the first clamping ring so that the plurality of bores open into the first open groove annular channel;

a second clamping ring having a first edge and a second edge, the first edge including a second open groove annular channel in the first edge, the first edge of the second clamping ring coupled to the second end face of the evaporator body so that the plurality of bores open into the second open groove annular channel;

a plurality of tension rods, each tension rod having a first end coupled to the first clamping ring and a second end coupled to the second clamping ring by a spring arrangement so that the first and second end faces of the tube are held in a sealing manner between the first and second clamping rings;

a first connecting pipe, in communication with the first open groove annular channel, for carrying a heating medium; and a second connecting pipe, in communication with the second open groove annular channel, for carrying the heating medium.

2. A thin-film evaporator according to claim 1, wherein the first clamping ring is configured as a head ring and is provided with an inlet pipe for a product to be treated and with a discharge pipe for vapors.

3. A thin-film evaporator according to claim 1, where the second clamping ring is provided with an inwardly projecting circumferential, conical collar.

4. A thin-film evaporator according to claim 1, wherein the first clamping ring and the second clamping ring are made of metal, and each clamping ring being provided with a corrosion resistant coating on an inner surface of the clamping ring.

5. A thin-film evaporator according to claim 1, wherein the rotor has a core tube and wherein the vanes are fastened to the core tube.

6. A thin-film evaporator according to claim 5, wherein the vanes are formed from at least three curved thin plates, each plate having longitudinal edges and a peak region, the plates lying against one another along their respective longitudinal edges, and each plate being fastened to the core tube at its peak region.

7. A thin-film evaporator according to claim 1, wherein the rotor has a periphery provided with removable corrosion resistant edge elements rigidly connected with the rotor.

8. A thin-film evaporator according to claim 7, wherein the rotor includes a rotor body formed from graphite, and the removable corrosion resistant edge elements being rigidly connected to the rotor body.

9. A thin-film evaporator according to claim 5, wherein the core tube and the vanes are formed from graphite.

10. A thin-film evaporator according to claim 5, wherein the core tube is composed of a carbon fiber reinforced material.

11. A thin-film evaporator according to claim 10, wherein the vanes are composed of a carbon fiber reinforced material.

12. A thin-film evaporator according to claim 7, wherein the rotor includes a rotor body formed from graphite, and the removable corrosion resistant edge elements being movably connected to the rotor body.

13. A thin-film evaporator according to claim 1, wherein the rotor includes a periphery provided with removable corrosion resistant edge elements movably connected with the rotor.

* * * * *